(12) United States Patent
Jung et al.

(10) Patent No.: US 8,470,114 B2
(45) Date of Patent: Jun. 25, 2013

(54) METHOD OF PREPARING THERMOPLASTICS-CONTINUOUS FIBER HYBRID COMPOSITE

(75) Inventors: Gi-hune Jung, Gyeonggi-do (KR); Myung-chul Park, Daejeon (KR); Yong-hoon Yoon, Daejeon (KR); Hee-june Kim, Daejeon (KR); Ji-hun Yun, Daejeon (KR); Cheol-hyun Park, Daegu (KR)

(73) Assignee: LG Hausys, Ltd., Seoul (KR)

( * ) Notice: Subject to any disclaimer, the term of this patent is extended or adjusted under 35 U.S.C. 154(b) by 539 days.

(21) Appl. No.: 12/452,391

(22) PCT Filed: Oct. 21, 2009

(86) PCT No.: PCT/KR2009/006087
§ 371 (c)(1),
(2), (4) Date: Dec. 29, 2009

(87) PCT Pub. No.: WO2010/047526
PCT Pub. Date: Apr. 29, 2010

(65) Prior Publication Data
US 2010/0291342 A1 Nov. 18, 2010

(30) Foreign Application Priority Data
Oct. 22, 2008 (KR) .................. 10-2008-0103506

(51) Int. Cl.
*B32B 37/00* (2006.01)

(52) U.S. Cl.
USPC ......... 156/148; 156/166; 156/242; 156/308.2

(58) Field of Classification Search
USPC ................ 156/148, 166, 169, 242, 308.2
See application file for complete search history.

(56) References Cited

U.S. PATENT DOCUMENTS

| | | | | |
|---|---|---|---|---|
| 4,539,249 A | * | 9/1985 | Curzio | 428/175 |
| 5,355,567 A | * | 10/1994 | Holliday | 28/282 |
| 5,626,643 A | * | 5/1997 | Woodside et al. | 65/442 |
| 7,226,518 B2 | * | 6/2007 | Loubinoux | 156/148 |

FOREIGN PATENT DOCUMENTS

| | | |
|---|---|---|
| KR | 10-0332727 | 9/2002 |
| KR | 10-2004-0025666 | 3/2004 |

* cited by examiner

*Primary Examiner* — Jeff Aftergut
(74) *Attorney, Agent, or Firm* — McKenna Long & Aldridge, LLP

(57) ABSTRACT

Provided is a method of preparing thermoplastics-continuous fiber hybrid composite, which is easily woven and has excellent uniformity and impregnation at the time of hot melt impregnation after the weaving, including: a) widely and uniformly stretching a bundle of glass fibers; b) heating the stretched glass fibers; c) preparing a thermoplastics-continuous fiber bonding material by binding the heated glass fiber with thermoplastics; d) preparing a multi-layered thermoplastics-continuous fiber bonding material by folding the bonding material in a shape of zigzag; and e) pressing the multi-layered thermoplastics-continuous fiber bonding material.

10 Claims, 3 Drawing Sheets

METHOD OF PREPARING THERMOPLASTICS-CONTINUOUS FIBER HYBRID COMPOSITE

This application claims the benefit of PCT/KR2009/006087 filed on Oct. 21, 2009 and Korean Patent Application No. 10-2008-0103506 filed on Oct. 22, 2008, all of which are hereby incorporated by reference herein for all purposes in their entirety.

TECHNICAL FIELD

The present invention relates to a method of preparing thermoplastics-continuous fiber hybrid composite, and more specifically, to a method of preparing thermoplastics-continuous fiber hybrid composite, which has excellent flexibility and is easily woven by binding the thermoplastics in a shape of tape without directly impregnating melted thermoplastic resin in a bundle of stretched continuous fibers and maximizes uniformly and impregnation at the time of hot melt impregnation after the weaving by forming a multi-layered structure that the continuous fibers and the thermoplastics are alternately stacked.

BACKGROUND OF THE INVENTION

Continuous fiber-reinforced thermoplastics continuously include a reinforced fiber, such as a glass fiber or a carbon fiber, in thermoplastics having relatively vulnerable mechanical intensity. The continuous fiber-reinforced thermoplastics are very excellent in mechanical intensity, rigidity, and impact performance, as compared to short fiber-reinforced thermoplastics having a length up to 1 mm or long fiber-reinforced thermoplastics (LFT) such as glass mat-reinforced thermoplastics (GMT), which have a length of about 5 to 50 mm.

In addition, the continuous fiber-reinforced thermoplastics having flexibility may be woven in a short direction or both directions and the continuous fiber-reinforced thermoplastic structure through this can be applied to products requiring various mechanical performance.

The continuous fiber-reinforced thermoplastics are generally prepared by a pultrusion method, a hot pressing method following commingle, etc.

The pultrusion method passes a bundle of the widely stretched continuous fibers to a liquid (or melting) resin tub or a die to impregnate thermoplastic resin in the bundle of the continuous fibers. The pultrusion method can increase a degree of impregnation when process conditions are optimized; however, it is difficult to control a content of thermoplastic resin, degrades flexibility, and is not easily woven.

A hot pressing method followed by commingle is a method of commingling the continuous fibers and the thermoplastic resin in a fiber type and then performing the hot pressing thereon. The hot pressed commingle fibers do not largely loss the flexibility of fibers due to the physical binding of the continuous fiber and the thermoplastic resin, such that the weaving is easy and when hot rolled pressing is performed after the weaving, the formability and impregnation are excellent and the content of the thermoplastic resin and the reinforced fiber of the continuous fiber-reinforced thermoplastics is freely controlled. However, since the thermoplastic resin is randomly mixed in the bundle of the continuous fibers, when the hot rolled pressing is performed after the weaving, the sufficient impregnation does not partially occur, the uniformity of physical properties is degraded and when the thermoplastic resin is prepared in a fiber type, it is restrictively applied to the thermoplastics having sufficient elongation characteristics in connection with workability.

Therefore, a development of the method of preparing thermoplastics-continuous fiber hybrid composite, which is easily woven, has excellent uniformity and impregnation upon the thermal melting impregnation after the weaving, and can use the thermoplastics in the various types, is urgently required.

SUMMARY OF THE INVENTION

In order to solve the above-mentioned problems of the related art, an aspect of the present invention is directed to providing a method of preparing thermoplastics-continuous fiber hybrid composite, which has excellent flexibility and is easily woven by binding the thermoplastics in a shape of tape without directly impregnating melted thermoplastic resin in a bundle of stretched continuous fibers and maximizes uniformity and impregnation at the time of hot melt impregnation after the weaving by forming a multi-layered structure that the continuous fibers and the thermoplastics are alternately stacked.

Another aspect of the present invention is directed to providing thermoplastics-continuous fiber hybrid composite prepared by the preparation method.

Another aspect of the present invention is directed to providing a continuous fiber-reinforced thermoplastic product in a sheet or profile type prepared using the thermoplastics-continuous fiber hybrid composite.

The above aspect of the present invention can be achieved by the present invention as will be described below.

To achieve the aspect, the present invention provides a method of preparing thermoplastics-continuous fiber hybrid composite, which is easily woven and has excellent uniformity and impregnation at the time of hot melt impregnation after the weaving, comprising:

a) widely and uniformly stretching a bundle of glass fibers;
b) heating the stretched glass fibers;
c) preparing a thermoplastics-continuous fiber bonding material by binding the heated glass fiber with thermoplastics in a shape of tape;
d) preparing a multi-layered thermoplastics-continuous fiber bonding material by folding the bonding material in a shape of zigzag; and
e) pressing the multi-layered thermoplastics-continuous fiber bonding material.

Further, the present invention provides thermoplastics-continuous fiber hybrid composite prepared by the method.

Further, the present invention provides a continuous fiber-reinforced thermoplastic product in a shape of sheet or profile prepared using the thermoplastics-continuous fiber hybrid composite.

Figure 1:
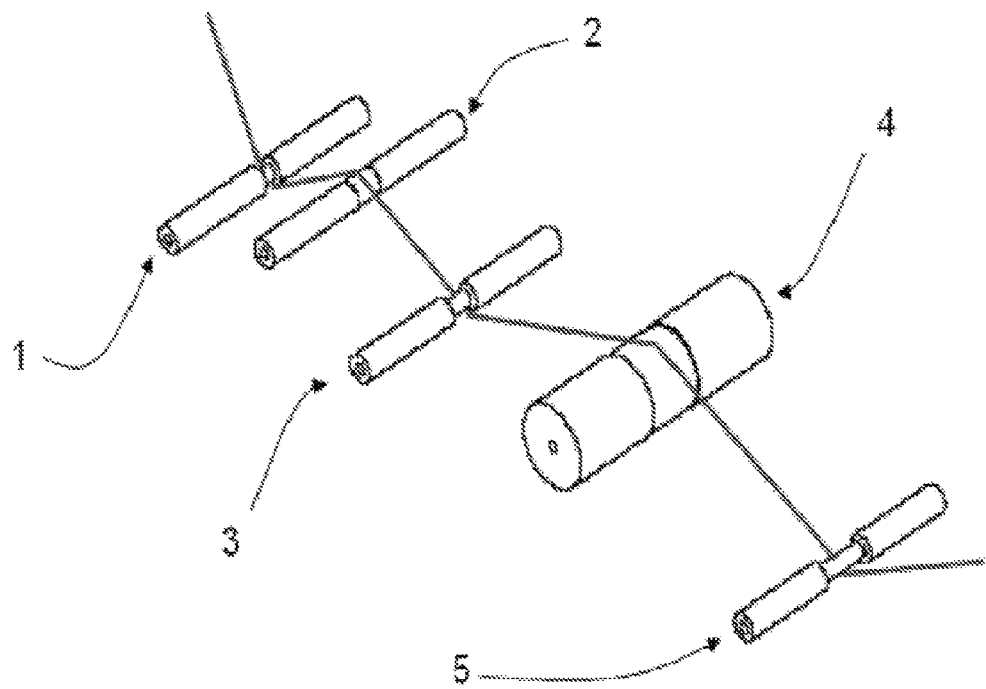
FIG. 1 is a diagram for schematically showing a process of widely and uniformly stretching a bundle of glass fibers by a convex bar and a guide bar.

| [Detailed description of main elements] |
| --- |
| 1: FIRST GUIDE BAR |
| 2: FIRST CONVEX BAR |
| 3: SECOND GUIDE BAR |
| 4: SECOND CONVEX BAR |
| 5: THIRD GUIDE BAR |

Hereinafter, the present invention will be described in detail.

The present invention provides a method of preparing thermoplastics-continuous fiber hybrid composite, which is easily woven and has excellent uniformity and impregnation at the time of hot melt impregnation after the weaving, comprising:

a) widely and uniformly stretching a bundle of glass fibers;
b) heating the stretched glass fibers;
c) preparing a thermoplastics-continuous fiber bonding material by binding the heated glass fiber with thermoplastics;
d) preparing a multi-layered thermoplastics-continuous fiber bonding material by folding the bonding material in a shape of zigzag; and
e) pressing the multi-layered thermoplastics-continuous fiber bonding material.

If the bundle of the glass fibers of step a) can be generally used for the continuous fiber-reinforced thermoplastics, any bundle is used without limitation. In addition, the smaller the diameter of the glass fiber is, the better the glass fiber is. Generally, it is preferable that the diameter of the glass fiber is about 15 to 20 μm. As the bundle of the glass fibers, 1200 TEX is easily prepared in a wider width than 2400 TEX, but since the 2400 TEX is higher in productivity when considering the economical aspect of the hybrid composite, it is more preferable to use the 2400 TEX.

At step a), the bundle of the glass fibers can be gradually widened and uniformly stretched by using a convex bar and a guide bar in a multi stage, wherein the number of the used convex bars and the guide bards can be controlled if necessary.

The guide bar plays a role of preventing the bundle of the glass fibers from being separated and guiding it to the convex bar and has a structure of which the central portion contacting the bundle of the glass fibers is flat and has a dented form with respect to both ends thereof, which is controlled according to the width of the glass fiber.

The convex bar plays a role of uniformly stretching the bundle of the glass fibers in a sheet form and it is preferable that the surface contacting the bundle of the glass fiber satisfies the following Equations 1 to 3.

$$L + \left(\frac{\pi}{2} - \phi\right)R = \sqrt{(x - x_0)^2 + L^2} + \left(\frac{\pi}{2} - \phi\right)r \quad \text{[Equation 1]}$$

$$\tan\phi = \frac{S}{H + \frac{R}{\sin\phi}} \quad \text{[Equation 2]}$$

$$\cos\phi = \frac{H + \frac{R}{\sin\phi}}{L + \frac{R}{\tan\phi}} \quad \text{[Equation 3]}$$

In Equations 1 to 3, R is a maximum radius of the convex bar, r is a minimum radius of the convex bar, H is a height from a horizontal line passing through the center of the guide bar to a center of the block bar, L is a distance from a contacting point of the glass fiber and the guide bar to a contacting point of the glass fiber and a center of the convex bar, S is a distance from a vertical line passing through the center of the convex bar to the guide bar, x is a horizontal distance from an axial symmetry plane of the convex bar to the glass fiber, $x_0$ is a horizontal distance from a longitudinal symmetry plane of the guide bar to the glass fiber, and $\phi$ is an angle joining the vertical line passing through the center of the convex bar with a tangent line of the convex bar.

In Equation 1, it is preferable that the r/R value is at least 0.95 and the $\phi$ value is 45°. When they do not reach the range, a phenomenon that the bundle of the glass fibers is not uniformly stretched but leans to one side and excessive tension is applied to a strand of the glass fibers occurs.

At step b), the stretched glass fiber is heated at a temperature of 120 to 280. When the glass fibers in a shape of tape bind to the thermoplastics within the temperature range, the finally prepared thermoplastics-continuous fiber hybrid composite has excellent flexibility and is easily woven. At this time, it is preferable that the temperature is approximately selected by referring to a melting temperature according to a type of the thermoplastics in the tape shape and the hybrid composite is optimized at a possible higher temperature in order to maintain the flexibility.

At step c), the thermoplastics in the tape shape may be arranged in parallel on the same plane without a gap in the state where a plurality of plastic tapes having a predetermined width is stretched. It is preferable that the sum of the widths corresponds to the widths of the heated glass fibers.

At step c) The thermoplastics in the tape shape may be positioned on the upper portion or the lower portion of the heated glass fiber but is preferably positioned on both the upper and lower portions thereof.

The thermoplastic tape having the predetermined width is not particularly limited. However, the thermoplastic tape may be 2 to 40 mm in width and 500 to 4000 in denier. The content of the continuous fiber in the prepared thermoplastics-continuous fiber hybrid composite can be controlled by controlling the width. Preferably, the content of the glass fiber is controlled to have 40 to 80 wt %.

At step c), the thermoplastics-continuous fiber bonding material may have a structure that the glass fiber and the thermoplastics in the tape shape are stacked or a structure that the thermoplastic tape, the glass fiber, and the thermoplastics in the tape shape are stacked in order. Preferably, thermoplastics-continuous fiber bonding material has a structure that the thermoplastics in the tape shape, the glass fiber, and the thermoplastics in the tape shape are stacked in order.

Since the thermoplastics in the tape shape having a predetermined width do not require special elongation characteristics unlike the related art including the commingle process, it can use most commercialized thermoplastics, which can be processed in a film or a tape shape. In the example of the present invention, polypropylene was used.

The thickness of the polypropylene in the shape of tape may be 30 to 200 μm and may comprise a coupling agent.

At step d), the multi-layered thermoplastics-continuous fiber bonding material has a zigzag shape by folding the contact surface between the pluralities of thermoplastics in the tape shape. As a result, the width is the same or similar as and to one width of the thermoplastic tape.

At step e), the pressing can be performed at a temperature of 120 to 280. When the temperature is too low, there is a problem in that the state where the multi-layered thermoplastics-continuous fiber bonding material is folded is not maintained and is released again. On the other hand, when the temperature is too high, the flexibility can be lost due to the excessive impregnation.

The thermoplastics-continuous fiber hybrid composite, which means the continuous fiber reinforced thermoplastics before the melting impregnation of the thermoplastic resin by the weaving and the hot rolled pressing, is prepared according to the method of preparing thermoplastics-continuous fiber hybrid composite.

The continuous fiber reinforced thermoplastic product according to the present invention uses the thermoplastics-continuous fiber hybrid composite to have the sheet or profile shape prepared by the weaving and the hot rolled pressing.

When performing the hot rolled pressing on the woven thermoplastics-continuous fiber hybrid composite, the thermoplastics are melting-impregnated in the reinforced fiber. The present has the multi-layered structure of which the continuous fiber and the thermoplastics are alternately stacked, thereby making it possible to exhibit very excellent impregnation even when a moving distance like a high viscosity resin is limited up to 100 μm.

EXAMPLES

Hereinafter, the detailed examples of the method of preparing thermoplastics-continuous fiber hybrid composite will be described with reference to the accompanying drawings.

The step of widely and uniformly stretching the bundle of the glass fibers was shown in detail in FIG. 1.

The bundle of the glass fibers used in the present invention used 2400 TEX that is configured of 4000 strands of the glass fiber having a diameter of 17 μm and the bundle of the glass fibers, which is subjected to sizing treatment to be suitable for the polypropylene resin, was used. Since the bundle of the glass fibers has a width of about 5 mm at early state, the central portion of the first guide bar 1 has a flat portion of 5 mm and has a dented form with respect to both ends thereof. Then, the first convex bar 2, which is designed to satisfy the condition of Equation 1, primarily widens the bundle of the glass fibers to a width of 12 mm. Thereafter, the central portion of the second guide bar 3 has a flat portion of 10 mm, which plays a role of aligning the bundle of the glass fibers, which is primarily widened to a width of 12 mm, at a width of 10 mm. The second convex bar 4, which is designed to satisfy the condition of Equation 1, secondarily widens the bundle of the glass fibers having a width of 10 mm from the second guide bar 3 to a width of 24 mm. Thereafter, the central portion of the third guide bar 5 has a flat portion of 20 mm, which plays a role of aligning the bundle of the glass fibers, which is secondarily widened to a width of 24 mm, at a width of 20 mm. As a result, the bundle of the glass fibers having a width of 5 mm at early stage is widely and uniformly stretched. The bundle of the glass fibers, which are widely stretched, was formed at a thickness formed of two and three glass fibers.

Figure 2:
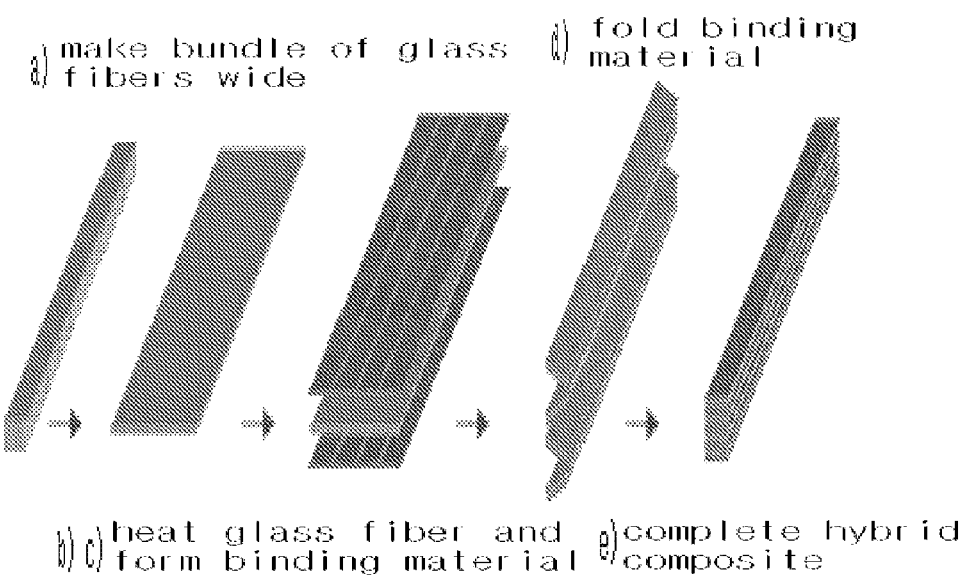
FIG. 2 is a diagram for schematically showing a method of preparing thermoplastics-continuous fiber hybrid composite according to the present invention.

FIG. 2 showed the method of preparing thermoplastics-continuous fiber hybrid composite, which has the multi-layered structure that the continuous fiber and the thermoplastics are alternately stacked and excellent uniformity and impregnation at the time of hot melt impregnation after the weaving, comprising: preparing a thermoplastics-continuous fiber bonding material by heating the stretched glass fibers and binding the heated glass fiber with thermoplastics in the tape shape; making the multi-layered thermoplastics-continuous fiber bonding material by folding the bonding material in a shape of zigzag; and pressing the multi-layered thermoplastics-continuous fiber bonding material. The thermoplastic in the tape shape is polypropylene treated with a coupling agent and thermoplastics having a denier of 2700 were used. Therefore, the thermoplastics-continuous fiber hybrid composite comprises 50 wt % of glass fiber.

Experimental Examples

As characteristic values for evaluating the performance, the flexural strength and the flexural modulus were used. In the sheet that is subjected to the hot rolled pressing after weaving the thermoplastics-continuous fiber hybrid composite prepared according to the present invention, a sample was collected according to the requirements of ASTM D790 and then, results of evaluating physical properties thereof was shown in FIG. 3.

Figure 3:
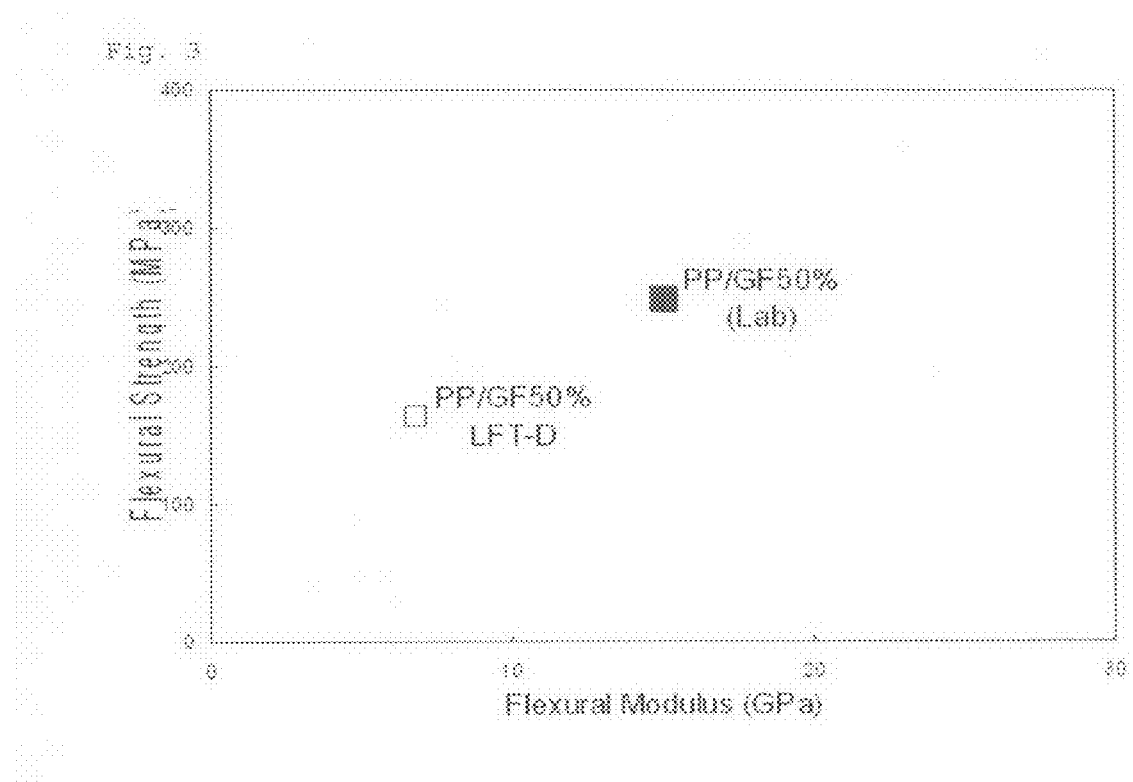
FIG. 3 is a diagram for schematically showing flexural strength and flexural modulus of thermoplastics-continuous fiber hybrid composite, etc., according to the present invention.
Figure 4:
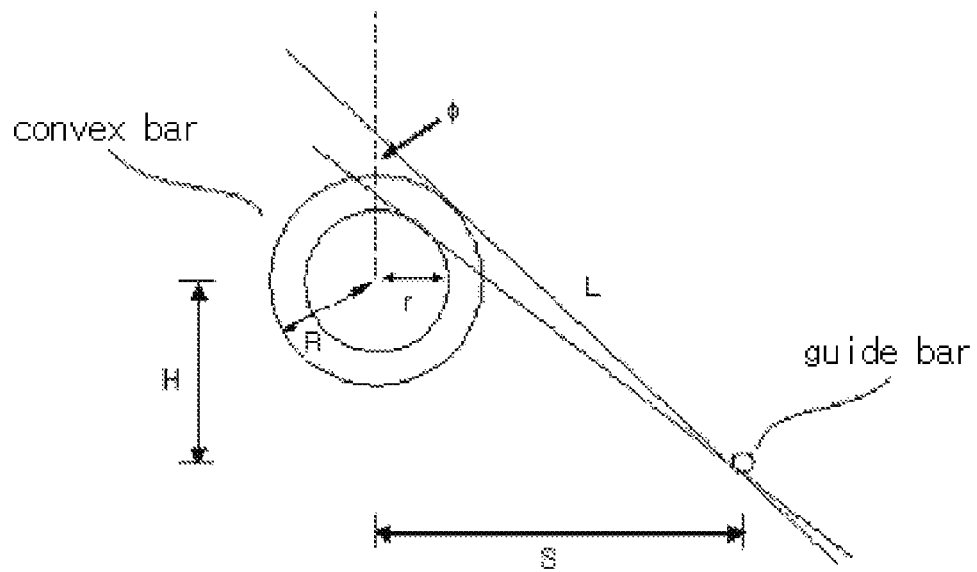
FIG. 4 and FIG. 5 represent in more detail about L, H, S, $\phi$, x and $x_0$ described in this specification.
Figure 5:
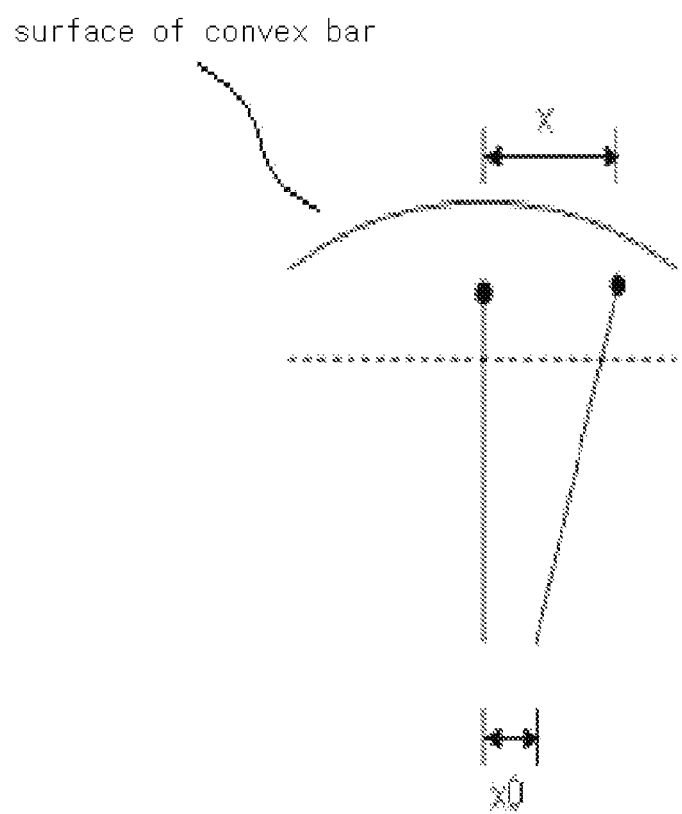

As shown in FIG. 3, it could be appreciated that the thermoplastics-continuous fiber hybrid composite (PP/GF 50%) prepared to the present invention is easily woven and has excellent flexural strength (250 MPa) and flexural modulus (15 GPa) as compared with the LFT-D (PP/GF 50%).

The above-mentioned thermoplastics-continuous fiber hybrid composite according to the present invention illustrates the present invention, by way of example only. It is apparent to those skilled in the art that various changes and modifications can be made in the scope and spirit of the present invention. It is to be understood that the present invention is intended to cover these changes and modifications included in the appended claims.

As described above, the present invention can provides the method of preparing thermoplastics-continuous fiber hybrid composite, which has excellent flexibility and is easily woven by binding the thermoplastics in a shape of tape without directly impregnating melted thermoplastic resin in the bundle of the stretched continuous fibers, maximizes uniformity and impregnation at the time of the hot melt impregnation after the weaving by forming a multi-layered structure that the continuous fibers and the thermoplastics are alternately stacked, and uses most commercialized thermoplastics that can be processed in the shape of film or tape.

While the present invention has been described with respect to the specific embodiments, it will be apparent to those skilled in the art that various changes and modifications may be made without departing from the spirit and scope of the invention as defined in the following claims.

What is claimed is:

1. A method of preparing thermoplastics-continuous fiber hybrid composite comprising the following steps of:
   a) widely and uniformly stretching a bundle of glass fibers;
   b) heating the stretched glass fibers;
   c) preparing a thermoplastics-continuous fiber bonding material by binding the heated glass fiber with thermoplastics in a shape of tape;
   d) preparing a multi-layered thermoplastics-continuous fiber bonding material by folding the bonding material in a shape of zigzag; and
   e) pressing the multi-layered thermoplastics-continuous fiber bonding material,
   wherein the step a) is carried out by uniformly stretching the bundle of glass fibers in a shape of sheet using a guide bar and a convex bar,
   wherein the guide bar has a structure of which a central portion is flat and both ends are convex, and plays a role of preventing the bundle of the glass fibers from being separated and guiding it to the convex bar, and the convex bar satisfies the following Equations 1 to 3 and plays a role of uniformly stretching the bundle of glass fibers in a shape of sheet, $$L + \left(\frac{\pi}{2} - \phi\right)R = \sqrt{(x-x_0)^2 + L^2} + \left(\frac{\pi}{2} - \phi\right)r \quad \text{[Equation 1]}$$

$$\tan\phi = \frac{S}{H + \frac{R}{\sin\phi}} \quad \text{[Equation 2]}$$

$$\cos\phi = \frac{H + \frac{R}{\sin\phi}}{L + \frac{R}{\tan\phi}} \quad \text{[Equation 3]}$$

wherein R is a maximum radius of the convex bar, r is a minimum radius of the convex bar, H is a height from a horizontal line passing through the center of the guide bar to a center of the block bar, L is a distance from a contacting point of the glass fiber and the guide bar to a contacting point of the glass fiber and a center of the convex bar, S is a distance from a vertical line passing through the center of the convex bar to the guide bar, x is a horizontal distance from an axial symmetry plane of the convex bar to the glass fiber, $x_0$ is a horizontal distance from a longitudinal symmetry plane of the guide bar to the glass fiber, and φ is an angle joining the vertical line passing through the center of the convex bar and a tangent line of the convex bar.

2. The method of preparing thermoplastics-continuous fiber hybrid composite of claim 1, wherein the step b) is carried out by heating the stretched glass fibers at 120 to 280° C.

3. The method of preparing thermoplastics-continuous fiber hybrid composite of claim 1, wherein the step c) is carried out by arranging a plurality of the thermoplastics in the shape of tape having a predetermined width in parallel on the same plane without a gap to be stretched, and the sum of the widths corresponds to widths of the heated glass fibers.

4. The method of preparing thermoplastics-continuous fiber hybrid composite of claim 3, wherein the thermoplastic tape having a predetermined width is 2 to 40 mm in width and 500 to 4000 in denier.

5. The method of preparing thermoplastics-continuous fiber hybrid composite of claim 1, wherein the step c) is carried out by positioning the thermoplastics in the shape of tape on an upper or an upper/lower portion of the heated glass fiber and the thermoplastics-continuous fiber bonding material has a structure that the glass fiber and the thermoplastics in the shape of tape are stacked or that the thermoplastics in the shage of tape, the glass fiber, and the thermoplastics in the shape of tape are stacked in order.

6. The method of preparing thermoplastics-continuous fiber hybrid composite claim 1, wherein the thermoplastics in the shape of tape of the step c) is polypropylene in a shape of tape.

7. The method of preparing thermoplastics-continuous fiber hybrid composite of claim 6, wherein the polypropylene in the shape of tape has a thickness of 30 to 200 μm and comprises a coupling agent.

8. The method of preparing thermoplastics-continuous fiber hybrid composite of claim 1, wherein the step e) is carried out by pressing at a temperature of 120 to 280° C.

9. The method of preparing thermoplastics-continuous fiber hybrid composite of claim 1, wherein the glass fiber comprises as 40 to 80 wt %.

10. The method of preparing thermoplastics-continuous fiber hybrid composite of claim 1, wherein the convex bar has a r/R value of at least 0.95 and a φ value of at least 45°.

* * * * *